(12) United States Patent
Hamada et al.

(10) Patent No.: US 7,121,249 B2
(45) Date of Patent: Oct. 17, 2006

(54) LUBRICATION SYSTEM AND METHOD, AND ENGINE INCORPORATING SAME

(75) Inventors: Yasunobu Hamada, Saitama (JP); Isamu Takahashi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/071,798

(22) Filed: Mar. 3, 2005

(65) Prior Publication Data
US 2005/0199213 A1    Sep. 15, 2005

(30) Foreign Application Priority Data
Mar. 9, 2004    (JP)    ............... 2004-066241

(51) Int. Cl.
*F01M 9/08*    (2006.01)
*F16H 57/04*    (2006.01)
(52) U.S. Cl. ................... 123/196 R; 184/6.5
(58) Field of Classification Search ............ 123/196 R, 123/196 CP; 184/6.5, 6.8
See application file for complete search history.

(56) References Cited

U.S. PATENT DOCUMENTS

| | | | | |
|---|---|---|---|---|
| 3,307,655 A | * | 3/1967 | Hatz | ............... 184/6 |
| 4,426,964 A | * | 1/1984 | Umeda et al. | .......... 123/195 A |
| 4,628,878 A | * | 12/1986 | Nakano et al. | .......... 123/196 R |
| 4,732,237 A | * | 3/1988 | Nakano | ...................... 184/6.5 |
| 4,741,303 A | * | 5/1988 | Kronich | ................... 123/192.2 |
| 5,857,441 A | * | 1/1999 | Yonezawa et al. | ...... 123/196 R |
| 6,439,208 B1 | * | 8/2002 | Jones | ....................... 123/559.1 |
| 6,561,315 B1 | * | 5/2003 | Furuya et al. | ............. 184/13.1 |
| 6,629,517 B1 | * | 10/2003 | Honda | .................... 123/196 R |
| 6,742,491 B1 | * | 6/2004 | Ghelfi et al. | ............ 123/196 R |

FOREIGN PATENT DOCUMENTS

JP    HEI 05-33686    8/1993

* cited by examiner

*Primary Examiner*—Noah P. Kamen
*Assistant Examiner*—Jason Benton
(74) *Attorney, Agent, or Firm*—Carrier, Blackman & Associates, P.C.; William D. Blackman; Joseph P. Carrier

(57) ABSTRACT

An improved lubrication structure is provided in an engine by optimizing the structure for recovering scooped oil for enhanced oil recovery efficiency. The oil, which has been scooped up and scattered by the rotation of a clutch, is captured within a concave groove provided within a cylindrical inner surface of a case cover facing the clutch. The captured oil is smoothly guided from the concave groove to an oil receiver of a crankcase via a bent upper edge part of an oil guide plate. The recovered oil passes through dropping holes of a recovered oil path and is supplied to a gear engagement part of a transmission system located below the recovered oil path.

20 Claims, 10 Drawing Sheets

SECTION A-A

SECTION C-C

LUBRICATION SYSTEM AND METHOD, AND ENGINE INCORPORATING SAME

CROSS-REFERENCE TO RELATED APPLICATIONS

The present invention claims priority under 35 USC 119 based on Japanese patent application No. 2004-066241, filed on Mar. 9, 2004. The subject matter of this priority document is incorporated by reference herein.

BACKGROUND OF THE INVENTION

1. Field of the Invention

The present invention relates to a lubrication system and method for a powertrain assembly, and more particularly relates to improved technology for a lubrication system in which lubrication is performed by mechanically scooping up oil accumulated in the lower part of a crankcase, and distributing the scooped-up oil to internal components of the powertrain.

2. Background of the Invention

In Japanese Utility Model Publication No. Hei 05-33686, a known lubrication structure is described, for an engine having a clutch mounted on a main transmission drive shaft that rotates in conjunction with a crankshaft. In the known structure, oil accumulated in the lower part of a crankcase is scooped up by the rotation of a clutch. The scooped oil is then received by oil receivers provided on the inner walls of the crankcase and a clutch cover. The received oil is then supplied, via a flow path, to an oil chamber extending above a transmission system. The oil from the oil chamber drops onto a gear engagement part of the transmission system on the main shaft and a countershaft (a power take-off shaft) via dropping holes formed in the oil chamber, and thereby the gear engagement parts are lubricated. A lubrication structure of this type has been disclosed, for example, in Japanese Utility Model Publication No. Hei 05-33686.

The engine described in the Japanese Utility Model Publication No. Hei 05-33686 is configured in such a way that a crankshaft is movably supported in a crankcase. The rotation of the crankshaft is transmitted to a main transmission drive shaft via engagement of gears and a clutch, and the rotation of the main shaft is further transmitted to a power take-off shaft (a countershaft) via a transmission system.

A lubrication structure is provided in which oil accumulated in the bottom (lower part) of the crankcase is scooped up by the rotation of the above-described clutch mounted on the main shaft, and in which the scooped oil is used to lubricate gear engagement parts of the transmission systems on the main shaft and the countershaft.

More specifically, concerning the lubrication for the gear engagement portion of the transmission system, oil which has been scooped up by the above-described clutch is received by oil receivers provided on the inner walls of the crankcase and a clutch cover and the oil is supplied to an oil chamber via a path.

A portion of the oil supplied to the oil chamber is dropped from the oil chamber onto the gear engagement parts of the transmission systems on the main shaft and the countershaft via a falling hole. In addition, the remaining scooped oil is supplied to the countershaft via a communicating path.

The oil receiver in the lubrication structure described in Japanese Utility Model Publication No. Hei 05-33686, which receives oil scooped up by the rotation of the clutch, is directly formed on the inner walls of the crankcase and clutch cover in the form of a concavity or a groove, and is integrally formed with the case and cover. Accordingly, selection of a structure or shape which has a sufficient oil recovery function as an oil receiver is restricted. Thus, it is desirable to enhance the recovery efficiency of the scooped oil in an oil receiving structure where the oil receiver is formed integrally with a case and cover.

In consideration of the above-described problems, it is desired to provide an improved technology for a lubrication structure in an engine, in which oil accumulated in the bottom (lower part) of a crankcase is scooped up via a rotator rotating in the crankcase and the scooped oil is used to lubricate a gear engagement portion and the like in the crankcase. An improved lubrication technology is one which enhances the lubrication efficiency of the gear engagement portion and the like by enhancing the efficiency of recovering the scooped oil, and which can be provided at low price and with simple structure modification.

SUMMARY OF THE INVENTION

The present invention provides an improved lubrication structure for a powertrain assembly, in which the improved lubrication structure is provided to solve the foregoing problems. The engine which utilizes the improved lubrication includes a crankcase having an oil pan at its lower position, a crankshaft which is rotatably supported in the crankcase, and a rotating oil scoop member which rotates in conjunction with the crankshaft and which scoops up oil in the oil pan located at the lower position of the crankcase. The engine further includes an oil receiver for receiving oil which has been scooped up via the rotary member, and an oil path for circulating oil from the oil receiver to selected portions of the crankcase for lubrication. In an illustrative embodiment of the present invention, the lubrication system includes an oil guide plate, for guiding oil to the oil receiver after the oil has been scooped up by the rotating oil scoop member and distributed about the crankcase.

The oil guide plate is able to guide the scooped oil to the oil receiver because of its location within the engine. Specifically, the oil guide plate abuts the oil receiver, and the oil receiver is positioned above a gear engagement part of a transmission system. Furthermore, the oil guide plate has, at its upper portion, a bent upper edge part for guiding the scooped oil to the oil receiver. The bent upper edge part is inclined and the upper edge thereof is bent in a direction away from the oil receiver.

The oil guide plate is arranged to cooperate with a roof plate for covering the guide plate. In the side view thereof, the guide plate is positioned below one end of the roof plate. The roof plate has a structure for capturing oil which has been scooped up by the rotary member and for guiding the captured oil to the oil receiver. Moreover, the roof plate is inclined in a way that oil is guided to the oil receiver by flowing on the surface thereof.

In a first aspect of the present invention, a lubrication structure in an engine includes an oil receiver. The oil receiver has an oil guide plate for guiding oil, which has been scooped up by the rotary member, to the oil receiver. Accordingly, it is possible to effectively guide oil, which has spattered in multiple directions, to the oil receiver via the oil guide plate and thereby improve oil recovery efficiency. As a result, it is made possible to improve lubrication performance in an engine.

In a second aspect of the present invention, the oil guide plate described above is capable of guiding the scooped oil to the oil receiver since the oil guide plate abuts the oil receiver, and the oil receiver is positioned above the gear engagement part of the transmission system. Accordingly, it is possible to effectively guide oil, which has spattered in multiple directions, to the oil receiver via the oil guide plate and to improve oil recovery efficiency. In addition, since the oil receiver is positioned above the gear engagement portion, received oil drops by gravity down upon the gear engagement portion. The gear engagement portion is thereby lubricated effectively. As a result, it is possible to improve lubrication performance in an engine.

In a third aspect of the present invention, an upper portion of the oil guide plate described above has a bent upper edge part for guiding the scooped oil to the oil receiver. The bent upper edge part is inclined, and the upper edge thereof is bent in a direction away from the oil receiver. Accordingly, the scooped oil is smoothly guided by the bent upper edge part, so as to highly effectively guide the oil to the oil receiver.

In a fourth aspect of the present invention, a roof plate covers the guide plate when viewed from the side, and is arranged to cooperate with the guide plate. The roof plate has a structure for capturing oil which has been scooped up by the rotary member and for guiding the captured oil to the oil receiver described above. Accordingly, the oil which has been scooped up by the rotary member, and has been captured by the roof plate, is efficiently guided to the oil receiver via the oil guide plate and is recovered.

In a fifth aspect of the present invention, the roof plate described above is inclined in a way that oil is guided to the oil receiver by flowing along the surface thereof. Accordingly, the oil which has been scooped up by the rotary member moves along the surface of the roof plate and thereby the oil is efficiently guided to the oil receiver.

The oil accumulated in the lower part of a crankcase is scooped up by use of a rotator attached to a shaft of a transmission system, the shaft being rotated by a crankshaft. The oil which has been scooped up by the rotator is collected using a roof plate, and the collected oil is guided to an oil receiver by use of an oil guide plate. In this way, the present invention is carried out.

Modes for carrying out the present invention are explained below by reference to an embodiment of the present invention shown in the attached drawings. The above-mentioned object, other objects, characteristics and advantages of the present invention will become apparent form the detailed description of the embodiment of the invention presented below in conjunction with the attached drawings.

BRIEF DESCRIPTION OF THE INVENTION

DETAILED DESCRIPTION OF THE INVENTION

Figure 1:
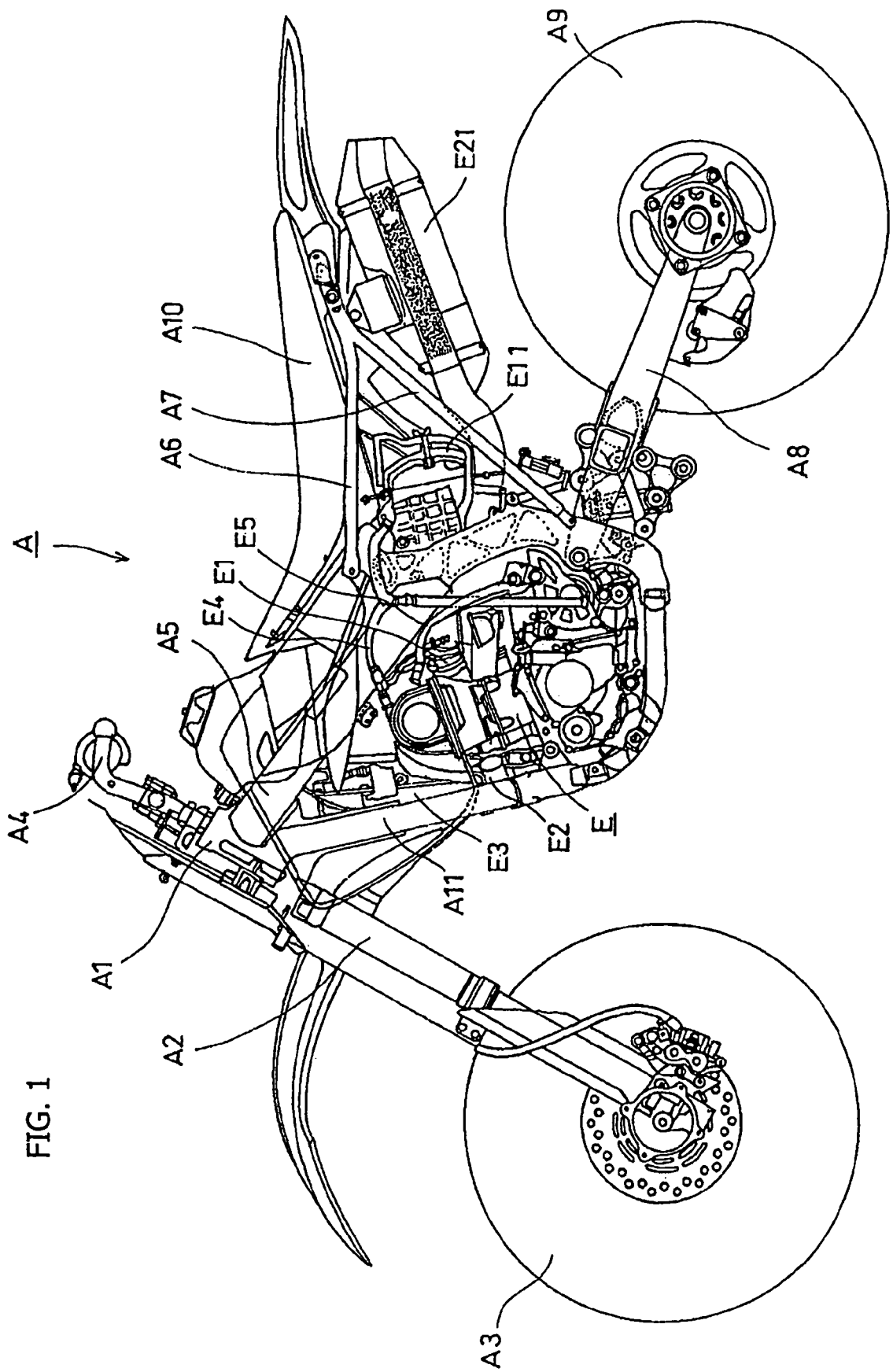
FIG. 1 is a side plan view of a motorcycle with a powertrain unit including a lubrication structure according to an illustrative embodiment of the present invention.

A selected illustrative embodiment of the present invention will be now described, with respect to the drawing figures.

FIG. 1 is a side plan view of a motorcycle which is a vehicle A provided with an engine E. The engine E is provided with an improved lubrication structure according to an embodiment of the present invention. The motorcycle of the present invention includes a head pipe A1 as a frame member for the front thereof. A front fork A2 is attached below the head pipe A1. A front wheel A3 is rotatably supported by the front fork A2. Above the head pipe A1, a handle bar A4 is attached.

In addition, a mainframe A5 is connected to the head pipe A1, obliquely pointing downward and extending in a rear direction therefrom. A seat rail A6 is attached to the rear upper portion of the mainframe A5. The seat rail A6 extends in a rear direction and points in a substantially horizontal direction therefrom. Moreover, a rear end portion of the mainframe A5 bends downward. A back stay A7 extends in a rearward direction and points upward from the rear end portion of the mainframe A5. The rear end portion of the back stay A7 is connected to the rear side of the seat rail A6.

The front end portion of a swing arm A8 is pivotally supported by the mainframe A5 in the vicinity of the attached portion of the back stay A7. A rear wheel A9, which is a driving wheel of the vehicle A, is supported at the rear side of the swing arm A8. Further, a seat member A10 for a rider is attached on the seat rail A6 located in a rearward position of the mainframe A5.

Furthermore, the top end of a down tube A11 is connected to the head pipe A1. The down tube A11 points and extends in a downward direction and then bends to extend substantially in a horizontal direction. The end portion thereof is connected to the bent end portion of the mainframe A5. The engine E is arranged in a space surrounded by the mainframe A5 and the down tube A11, so that the engine E is held in the space. The space is formed below the mainframe A5. The engine E is supported by the mainframe A5 and the down tube A11 via supporting members. In this way, the engine E is mounted on the vehicle A.

FIG. 1 shows the engine E mounted on the vehicle A. FIG. 1 also shows an air inlet pipe E1 arranged on the rear upper portion of the engine E, an air cleaner E11 connected thereto, and an exhaust pipe E2 which is arranged on the front side of the engine E and passes the side of the engine E to extend in a rear direction. Also shown are a muffler E21 connected to the rear side of the exhaust pipe E2, a radiator E3 for cooling the engine E arranged in the front side of the engine E, a blowby gas pipe E4, a kick starter pedal E5 and the like.

A structural overview of the engine E which is mounted on the above-described motorcycle will be described with respect to FIG. 2.

Figure 2:
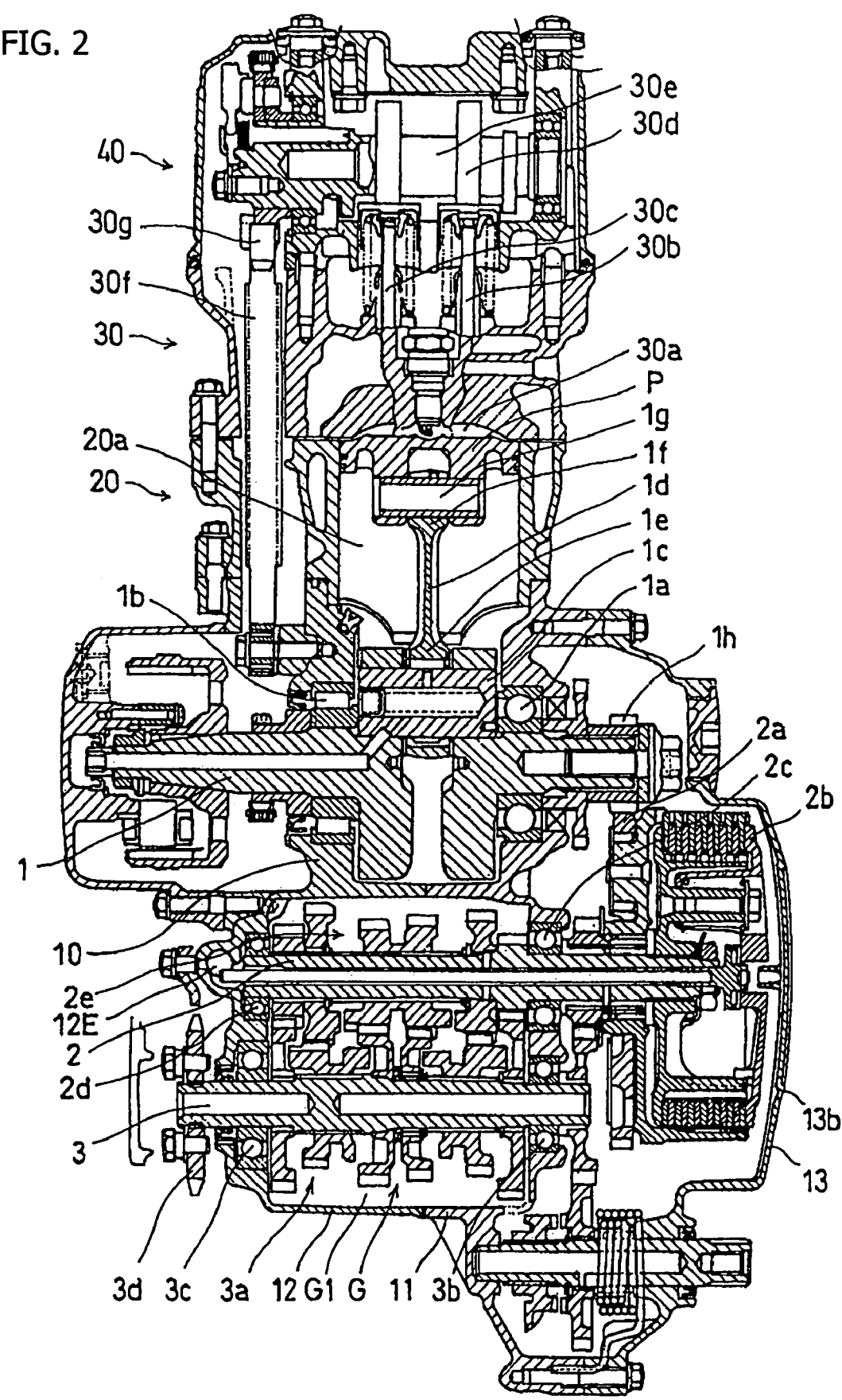
FIG. 2 is a cross-sectional view of the engine and transmission of the motorcycle of FIG. 1, showing the principal structure of the powertrain according to the illustrative embodiment of the present invention, including a clutch provided on one end of the main shaft, and showing a cover surrounding the clutch.

In FIG. 2, the principal portion of the engine E of the present invention is shown in cross-sectional view. As shown in this figure, the engine E includes a crankcase 10, a cylinder block 20 connected to the crankcase 10, a cylinder head 30 to be connected to the cylinder block 20 and a cylinder head cover 40. These are clamped and fixed together via stud bolts and the like, thereby constituting the main structure of the engine E.

The crankcase 10 has a structure in which half cases 11 and 12 are integrally connected to each other. The half cases 11 and 12 are formed by dividing the crankcase 10 into right and left portions. In the crankcase 10, formed of the combined half cases 11 and 12, a crankshaft 1, a main shaft 2 and countershaft 3 of a transmission system G are rotatably bearing-supported and extend in parallel.

The crankshaft 1 is supported by bearings 1a and 1b. A connecting rod 1d is rotatably attached to a crankpin 1c of the crankshaft via a bearing located at the large-end 1e thereof. A piston P is pivotally attached to the small-end 1f of the connecting rod 1d via a piston pin 1g. In this embodiment, there is provided one piston P and the engine E of the present invention is a single cylinder 4-cycle engine.

A gear 1h, having a relatively small outer diameter, is attached to the crankshaft 1 near the right end thereof. The gear 1h is a drive gear engaged with a driven gear 2a. The driven gear 2a is loosely fitted to the main shaft 2 of the above-described transmission system G. The driven gear 2a, which is loosely fitted to the main shaft 2, is provided near the right end of the main shaft 2 together with a clutch 2b. The clutch 2b selectively transmits the rotation of the driven gear 2a to the main shaft 2 via its open/close operation. In addition, the shaft part located between bearings 2c and 2d which rotatably support the main shaft 2 is equipped with a plurality of gears 2e for shifting.

The countershaft 3 is equipped with a plurality of gears 3a, which selectively engage with the plurality of gears 2e mounted on the main shaft 2 to rotate the countershaft 3 at a desired gear ratio. The gears 3a are mounted to the portion of the shaft located between bearings 3b and 3c, which supporting the countershaft 3. Moreover, a sprocket 3d, which is a driving wheel of the vehicle A, is attached to the left end of the countershaft 3. The sprocket 3d is provided for driving the rear wheel A9.

Accordingly, the rotation of the crankshaft 1 is transmitted to the main shaft 2 via engagement between the drive gear 1h and the driven gear 2a, and further via the open/close clutch 2b. The rotation of the crankshaft 1, which has been transmitted to the main shaft 2, is then transmitted to the countershaft 3 from the main shaft 2 via appropriate and selective engagement between the plurality of gears 2e and 3a for shifting, which are equipped on the countershaft 3 and main shaft 2.

The rotation transmitted from the main shaft 2 to the countershaft 3 is used to rotate the countershaft 3 at a desired gear ratio. The gear ratio is based on the selection of the gears 2e and 3a to be engaged. The rotation of the countershaft 3 is transmitted to the driving sprocket 3d attached to the left end of the shaft 3, and is further transmitted to the rear wheel A9 which is a driving wheel for driving a vehicle (see FIG. 1) via a drive chain, a drive belt or the like, thereby making it possible to allow the vehicle A to drive at a desired speed.

A cylindrical hole 20a for the piston P is provided in the cylinder block 20. The engine E of this embodiment includes one piston P, and accordingly only one cylindrical hole 20a is provided therein. As is well known, the piston P reciprocates in the cylindrical hole 20a in conjunction with the motion of the connecting rod 1d, the motion triggered by the rotation of the crankshaft 1.

In the cylinder head 30, a combustion chamber 30a is provided which is formed by the cylindrical hole 20a of the cylinder block 20 and the concave located at the lower part of the cylinder head 30. Openings (not shown) for intake/ exhaust are formed in this combustion chamber 30a. These openings respectively communicate with intake and exhaust paths. In addition, intake and exhaust valves 30b and 30c for opening/closing the openings, only parts of which are shown here, are disposed in the openings.

The cylinder head 30 includes valve mechanism for activating the intake and exhaust valves 30b and 30c. A cam 30d, a camshaft 30e and the like which constitute the valve mechanism are disposed therein. The camshaft 30e is attached with a sprocket 30g for a timing chain 30f. The timing chain 30f is used to rotate the camshaft 30e with half the number of the rotations of the crankshaft 1. The cylinder head cover 40 is mounted to the upper part of the cylinder head 30.

The engine E of this embodiment generally includes the structure described above. However, the engine E further includes an inventive lubrication structure. Hereinafter, this lubrication structure will be described.

Figure 5:
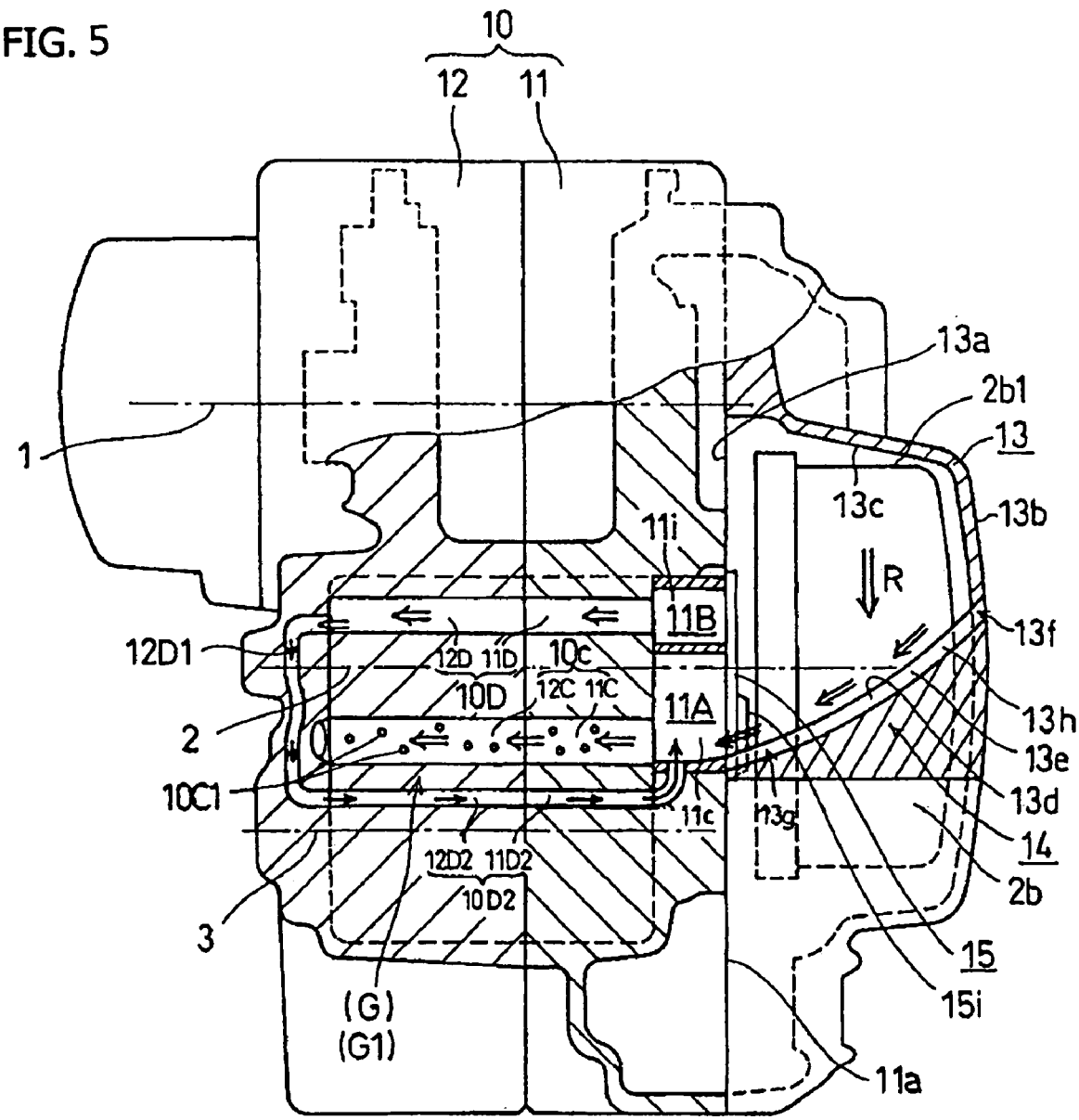
FIG. 5 is an explanatory diagram showing the parallel arrangement of the recovered oil path and injected oil path, as well as an overflow oil path extending from the injected oil path to the recovered oil path.

As described above, and as shown in FIG. 2 and in a diagram of FIG. 5, the crankcase 10 includes right and left divided half cases 11 and 12 integrally connected to each other. In the crankcase 10, the crankshaft 1 is rotatably bearing-supported. The rotation of the crankshaft 1 is transmitted to the main shaft 2 of the transmission system G via engagement between the drive gear 1h and driven gear 2a and via the clutch 2b.

The rotation of the crankshaft 1, which has been transmitted to the main shaft 2, is configured to be further transmitted to the countershaft 3 via engagement between the shifting gears 2e and 3a. In the lubrication structure of this embodiment, oil scooped up by the rotating part of the rotation transmission system is utilized to lubricate the gear engagement part G1 of the transmission system G of the engine E.

The clutch 2b on the main shaft 2 is a rotator having a maximum diameter in the rotation transmission system. The clutch 2b is utilized in this embodiment for the purpose of scooping up oil. Accordingly, the lower part of the clutch 2b is dipped into oil accumulated in the lower part of the crankcase 10.

Figure 3A:
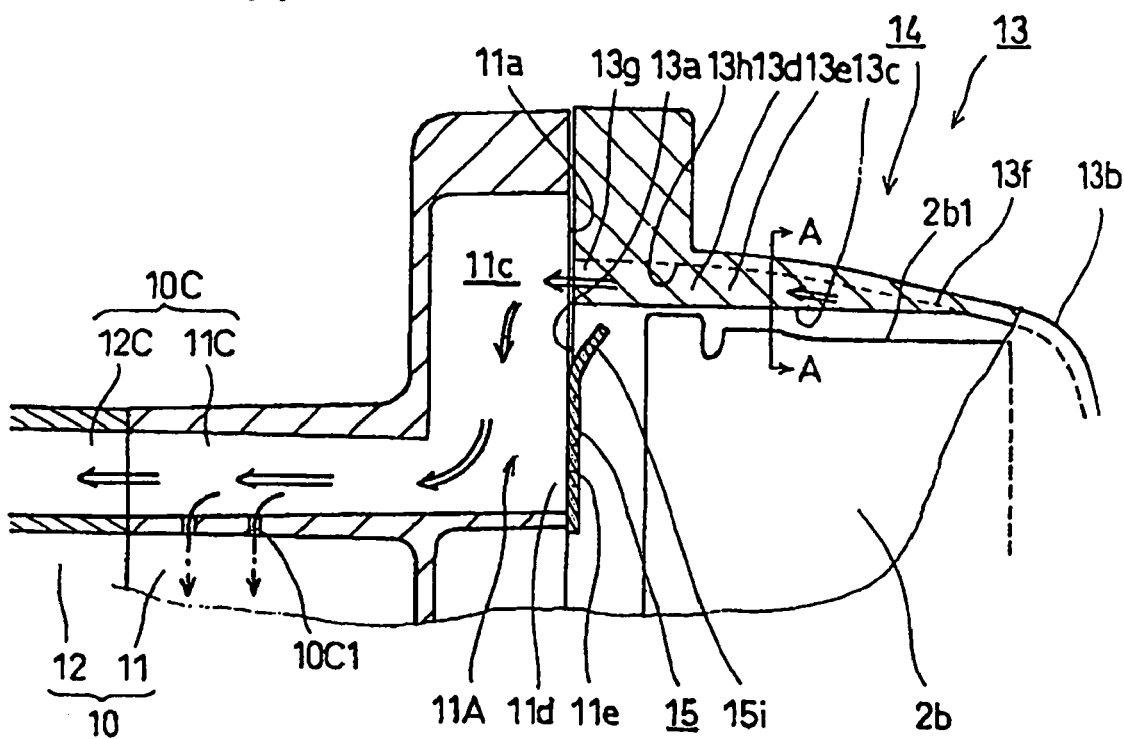
FIG. 3A is detail side view showing the upper portion of the clutch, and a groove formed in the clutch cover that communicates with an oil path formed in the crank case.
Figure 3B:
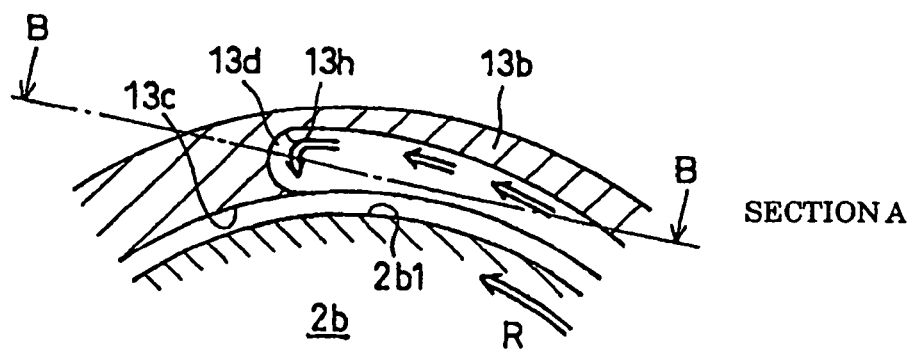
FIG. 3B is a cross-sectional view taken along A—A line in FIG. 3A, showing the shape of the groove formed in the clutch cover, and showing the position of the groove with respect to the rotation direction (arrow R) of the clutch.
Figure 4:
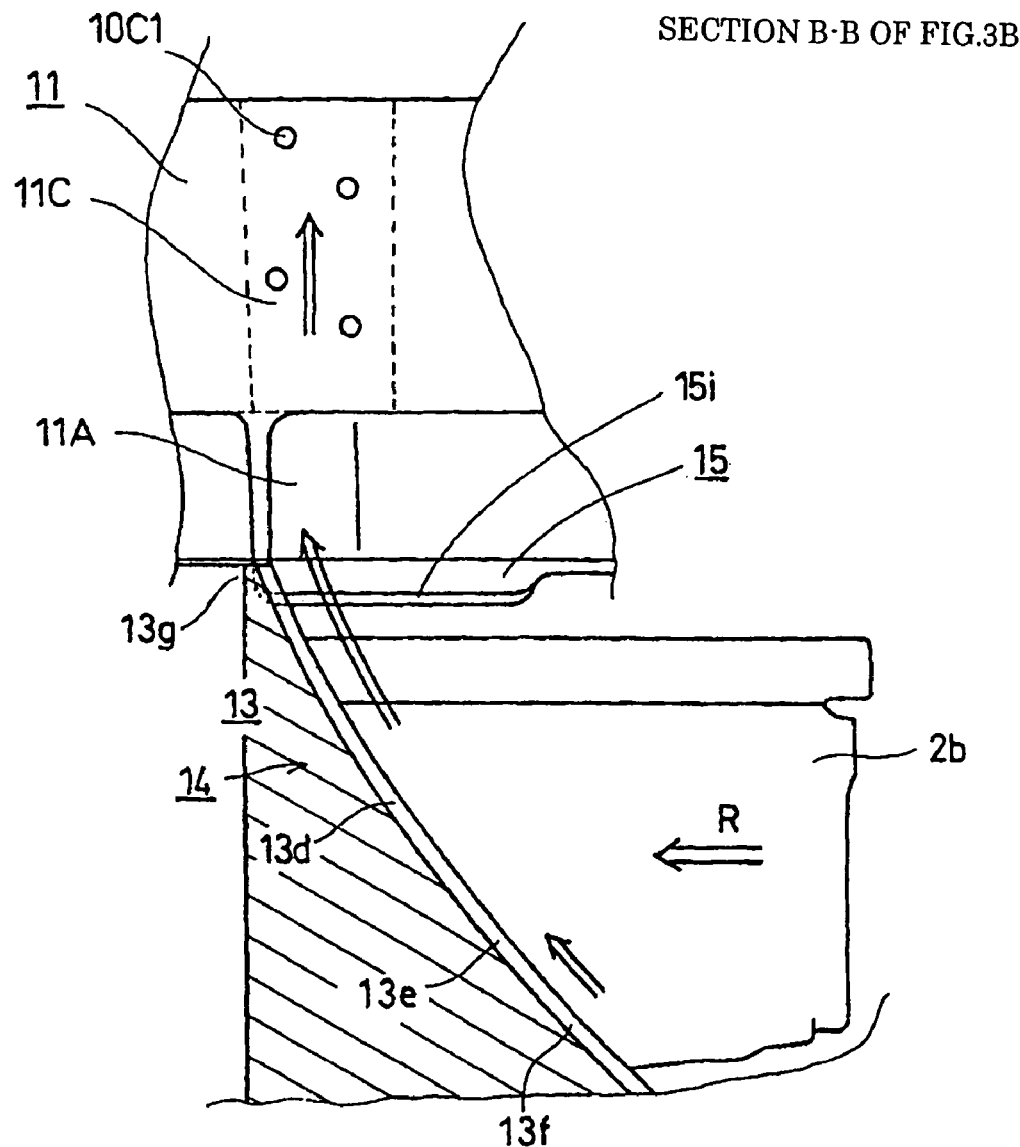
FIG. 4 is a cross-sectional view taken along B—B line in FIG. 3B, which shows the curved shape of the concave groove along the roof plate.

As shown in FIGS. 3 and 4 and in the diagram of FIG. 5, there is provided a structure in which the oil, which has been scooped up via the rotation of the clutch 2b, is captured by an oil capturing mechanism, and is recovered in an oil receiver 11A. The recovered oil is supplied from the oil receiver 11A to the interior of the crankcase 10, via oil paths 11C and 12C that communicate with the oil receiver 11A, in order to lubricate the gear engagement part G1 of the transmission system G. The oil paths 11C and 12C are located within the right and left half cases 11 and 12 of the divided crankcase 10.

Figure 6:
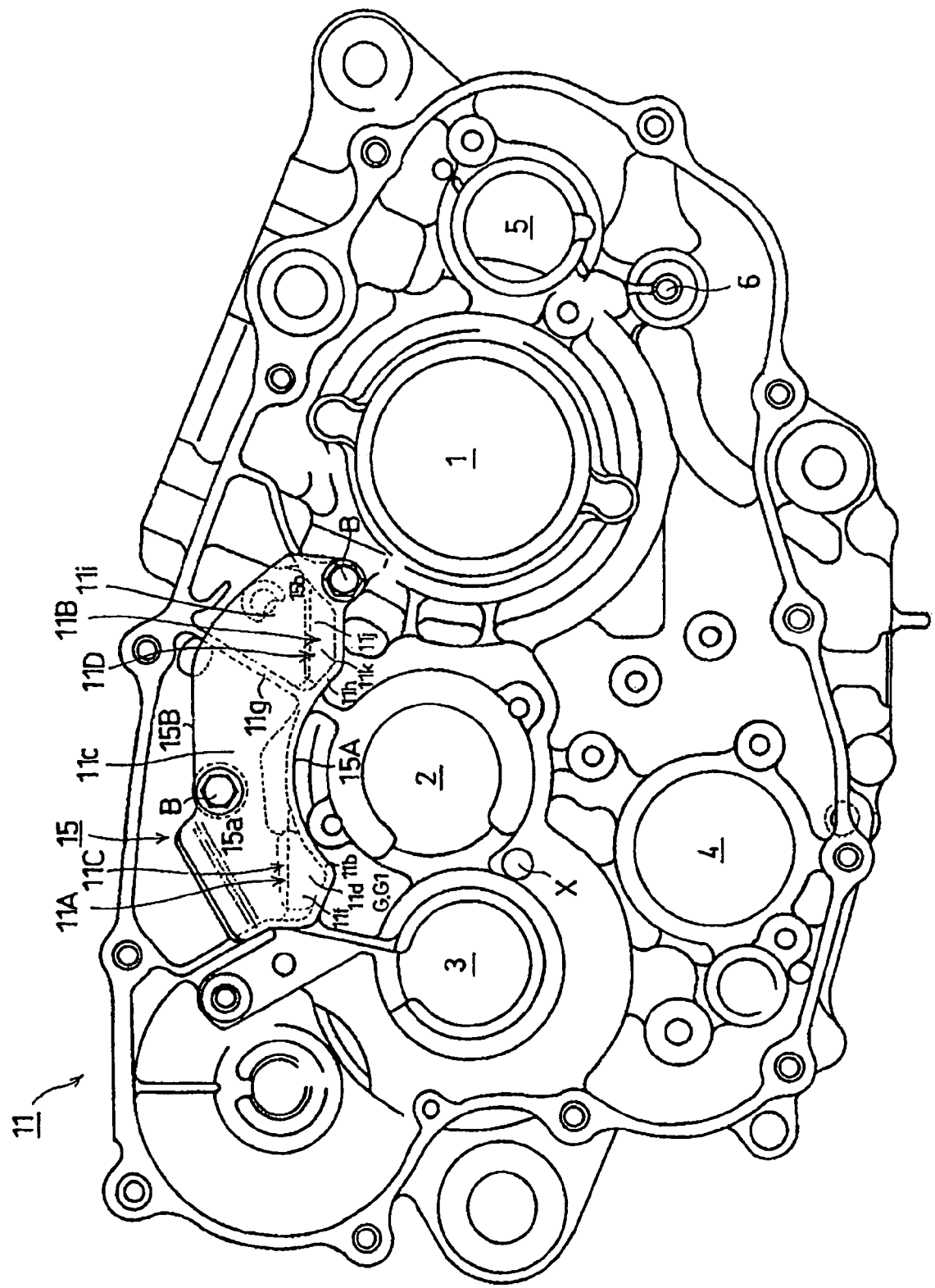
FIG. 6 is a side view of the engine, showing a right half case of a crankcase and showing the arrangement of the recovered oil receiver and the injected oil receiver with respect to the main shaft.
Figure 7:
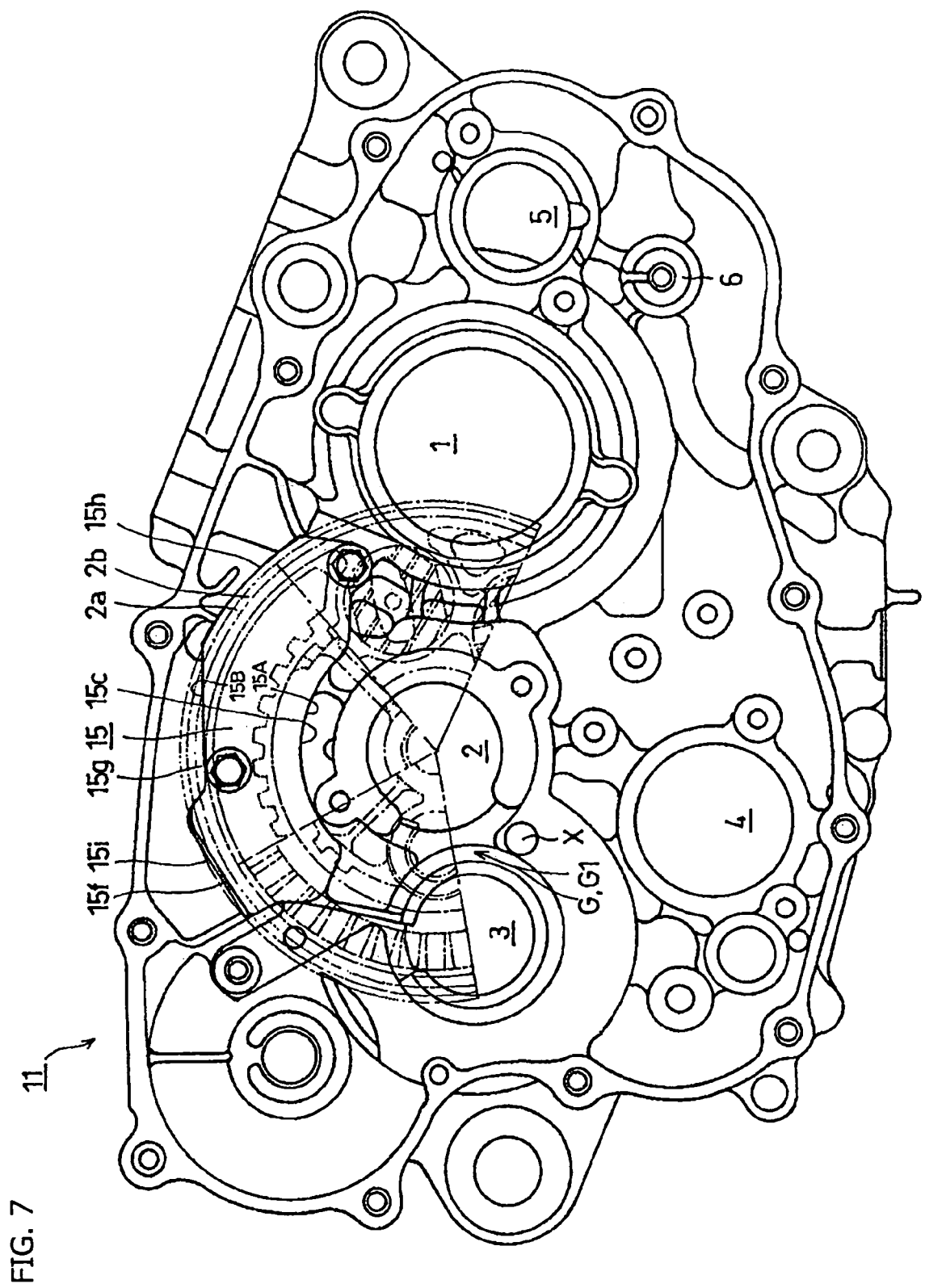
FIG. 7 is a side view of the engine, showing the right half case of the crankcase of the present invention, which is similar to FIG. 6.
Figure 8:
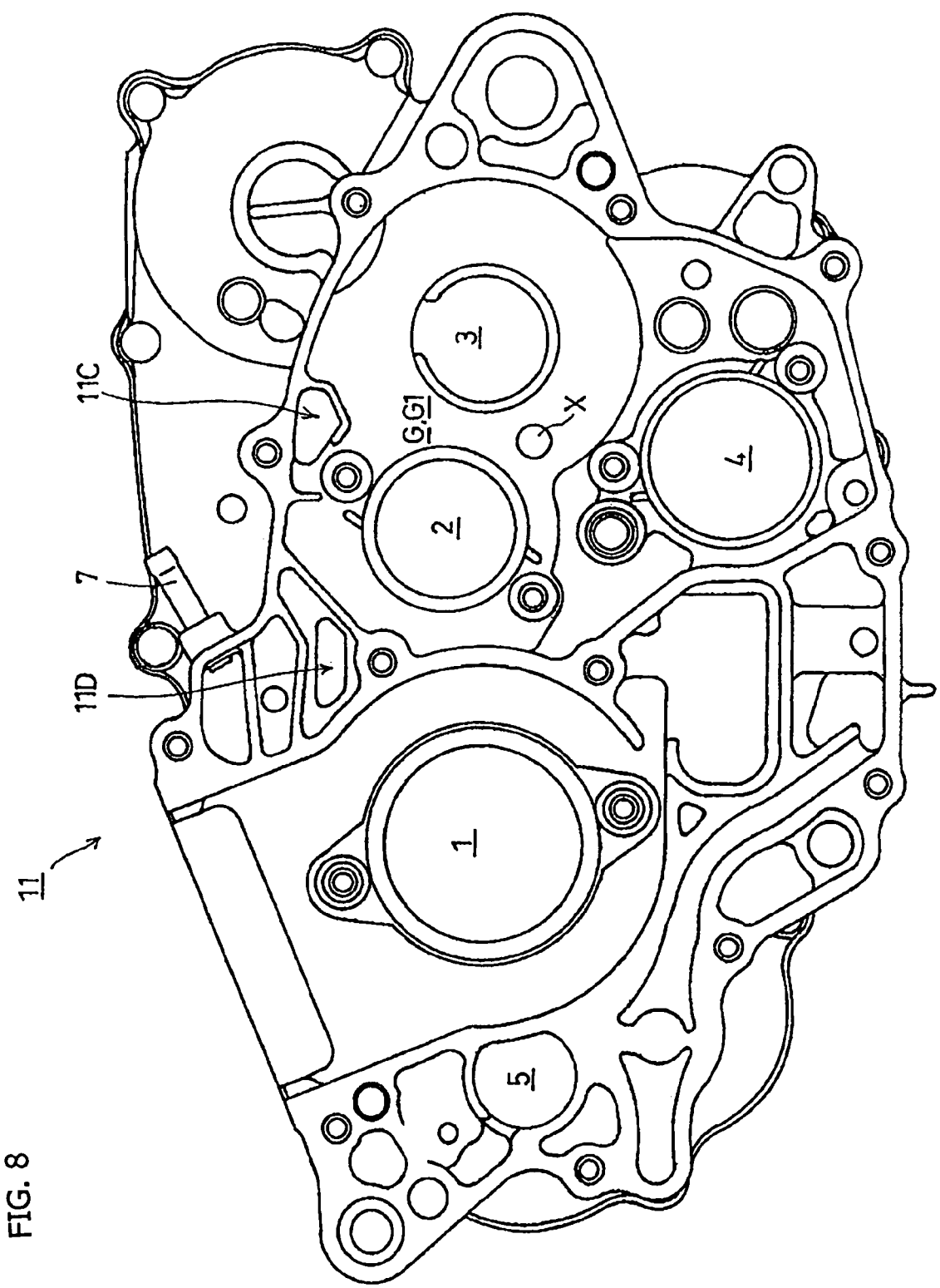
FIG. 8 is a view showing another side of the right half case of the crankcase of the present invention.

In order to lubricate the gear engagement part G1 of the transmission system G, a structure is adopted that can be understood from FIG. 6, which shows the side view of the right half case. As shown, a structure is adopted in which the transmission system G is located below the recovered oil receiver 11A and is positioned immediately underneath a recovery oil path 10C, to be described later. The recovery oil path 10C is composed of the recovered oil paths 11C and 12C, communicates with the recovered oil receiver 11A, and extends across the crankcase 10 in the direction orthogonal to the front-back-direction of the vehicle. In the drawing, reference numerals 4, 5 and 6 denote a shift drum, a balancer shaft and an oil pump, respectively.

As shown in FIG. 2 and in the diagram of FIG. 5, the clutch 2b is mounted on the right end of the main shaft 2. While mounted thereon, much of the clutch 2b is configured to protrude to the outside from the side 11a of the right half case 11 of the divided crankcase 10, the side 11a being equipped with the clutch. The portion of the clutch 2b which protrudes from the side 11a of the right half case 11 is completely covered with the case cover 13.

The outer part of the case cover 13 is bowl-shaped, and includes a concavity for covering the portion of the clutch 2b protruding from the right half case side 11a (see FIGS. 2, 3 and 5). An opening 13a of the case cover 13, which substantially forms the opening of the bowl-shaped concavity, is applied to the side 11a of the right half case 11 from outside, and is fixed thereto by appropriate fasteners such as bolts. In this way, the case cover 13 is attached to the side 11a of the half case 11. Moreover, the outer side end of the case cover 13, which substantially forms a bottom 13b of the bowl-shaped concavity of the case cover 13, is configured to be completely sealed. The case cover 13 is attached to the side 11a of the right half case 11, and thereby the side 11a of the right half case 11 is completely covered.

As can be seen by referring to FIGS. 2 to 5, the concavity of the bowl-shaped case cover 13, which covers the protruding portion of the clutch 2b, is set to a substantial depth. In addition, the cylindrical inner surface 13c, which surrounds the circumference 2b1 of the outside diameter of the clutch 2b, is substantially concentric with the circumference 2b1 of the clutch 2b. The circumference 2b1 of the outside diameter of the clutch 2b, and the cylindrical inner surface 13c of the case cover 13, are configured to face each other with a relatively narrow space interposed therebetween. As shown in FIGS. 3 to 5, a concave groove 13d is formed on the cylindrical inner surface 13c of the upper part of the case cover 13, oriented to extend obliquely across the cylindrical inner surface 13c in the width direction.

The concave groove 13d is the mechanism for capturing the oil which has been scooped up through the rotation of the clutch 2b, and is formed on the cylindrical inner surface 13c corresponding to a predetermined upper portion of the case cover 13. The concave groove 13d is formed as a groove obliquely crossing the cylindrical inner surface 13c in the width direction. The groove 13d is a structure which has been cut to have a certain width and depth. The structural portion of the cylindrical inner surface 13c which includes the oil capturing mechanism is positioned as a roof plate 14. The roof plate 14 overlies an oil guide plate 15 when viewed from the side of the oil guide plate 15. The roof plate 14 also cooperates with the oil guide plate 15 of oil recovering mechanism to be described later (see FIG. 3).

The concave groove 13d, which is the oil capturing mechanism in the roof plate 14, is formed at a position where the oil can be most effectively captured. The cylindrical inner surface 13c corresponding to a certain upper portion of the case cover 13 is selected as the optimal position for capturing the scooped up oil. This position is located substantially above both the main shaft 2 and countershaft 3 of the transmission system G when the crankcase 10 is viewed from the top thereof, as shown in FIG. 5.

As described above, the concave groove 13d obliquely crosses the cylindrical inner surface 13c of the case cover 13 in the width direction. More specifically, from the outside of the case cover 13 to the inside of the crankcase 10, that is, from the cover sealing side 13f, which is the right side of the case cover 13, to the cover opening side 13g which is the left side of the case cover 13 as shown in FIGS. 3 to 5, the concave groove 13d obliquely crosses the cylindrical inner surface 13c of the case cover 13 in the width direction. The concave groove 13d obliquely crosses the cylindrical inner surface 13c in the width direction so that the concave groove 13d can be brought in line with the rotation direction R of the clutch 2b.

The concave groove 13d, which obliquely crosses the cylindrical inner surface 13c constituting the roof plate 14 in the above-described manner, is formed to have the following structure, of which the cross-sectional view is shown in FIG. 3B. That is, the concave groove 13d is formed by gouging the cylindrical inner surface of the case cover 13 to have an arc-shaped groove with certain width and depth. The concave groove 13d extends across the inner surface 13c in a smooth curve. In addition, as can be seen from FIG. 3A, the top of the concave groove 13d, that is, the bottom 13h of the of the roof plate 14, is a structure which has a gentle curve and gradually gets slightly higher with distance from the cover sealing side 13f, which is the outside of the case cover 13. Thus the bottom 13h (or top of the concave groove 13d) is highest adjacent to the cover opening side 13g, which is the inner side of the case cover 13. Specifically, the concave groove 13d is formed to have such a structure that has a gentle curve and in which the bottom 13h get deeper with distance from the cover sealing side 13f, which is the outside of the case cover 13.

The above-described structure of the concave groove 13d is the optimal structure for effectively capturing the oil which has been scooped up via the rotation of the clutch 2b. The oil which has been captured by the concave groove 13d is guided from the roof plate 14 side of the case cover 13 to the inner side of the crankcase 10 via the oil guide plate 15, to be described later. More specifically, the oil is guided to the recovered oil receiver 11A, which is formed along the side 11a of the right half case 11 (see FIGS. 3 to 5).

The recovered oil receiver 11A is formed on the side 11a of the right half case 11 of the crankcase 10. The oil receiver 11A communicates with the concave groove 13d for capturing oil, which is formed in the roof plate 14 of the case cover 13 along the side 11a. As shown in FIGS. 5 to 8, the recovered oil receiver 11A is accordingly formed above the main shaft 2 of the transmission system G, in a position slightly toward the rear side of a vehicle. This position is substantially above the gear engagement part G1, where the shifting gears 2e and 3a are engaged with each other. The shifting gears 2e and 3a are located on the main shaft 2 and countershaft 3 of the transmission system G. For reference purposes, reference numeral 7 in FIG. 8 denotes a breather pipe.

As shown in FIGS. 3 and 6, the oil guide plate 15 abuts and confronts a side 11e of a divided space 11c. The recovered oil receiver 11A is covered by the oil guide plate 15 (see FIGS. 3 and 6). As seen in FIG. 3, the side 11e is the side 11a of the right half case 11. Specifically, this side of the divided space 11c is partitioned by a rib 11b on the side 11a of the right half case 11 to which the clutch 2b is mounted (see FIG. 6). More specifically, this side of the lower part 11d of the divided space 11c is partitioned by the rib 11b at a position substantially above the main shaft 2 on the side 11a. The oil receiver 11A is placed at a position 11f, which is nearest the rear side of a vehicle and is lower than the lower part 11d of the divided space 11c covered with the oil guide plate 15.

In addition, the side 11e of the lower part 11d of the divided space 11c (see FIG. 3) is covered with the oil guide plate 15. At the same time, the lower part 11j of a small divided space 11i is also covered with the oil guide plate 15. The small divided space 11i is adjacent to the divided space 11c, with a rib 11g interposed between small divided space 11i and the divided space 11c, and is further partitioned by a rib 11h. In this way, an oil receiver 11B is formed which is different from the recovered oil receiver 11A (see FIG. 6).

Figure 9:
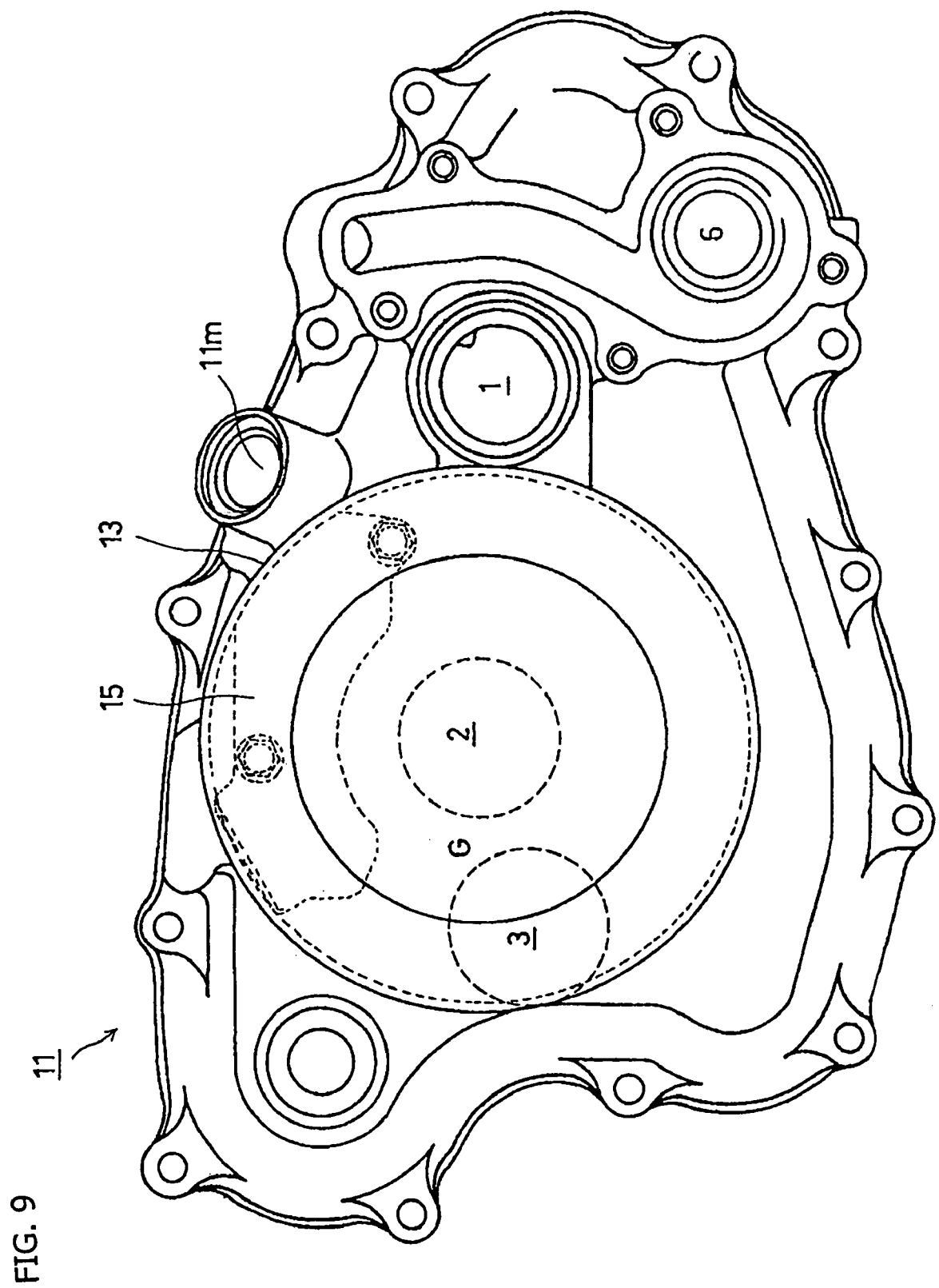
FIG. 9 is a view showing the outside of the right half case of the crankcase of the present invention.

The oil receiver 11B is positioned above the main shaft 2, at a location that is slightly nearer the front side of a vehicle, and is formed at a position 11k which is lower than the lower position 11j of the small divided space 11i. The position 11k of the small divided space is situated at a position slightly lower than the lower position 11f of the recovered oil receiver 11A. The oil receiver 11B is provided to receive the injected oil and therefore includes an oil inlet 11m communicating therewith, which is shown in FIG. 9.

Figure 10A:
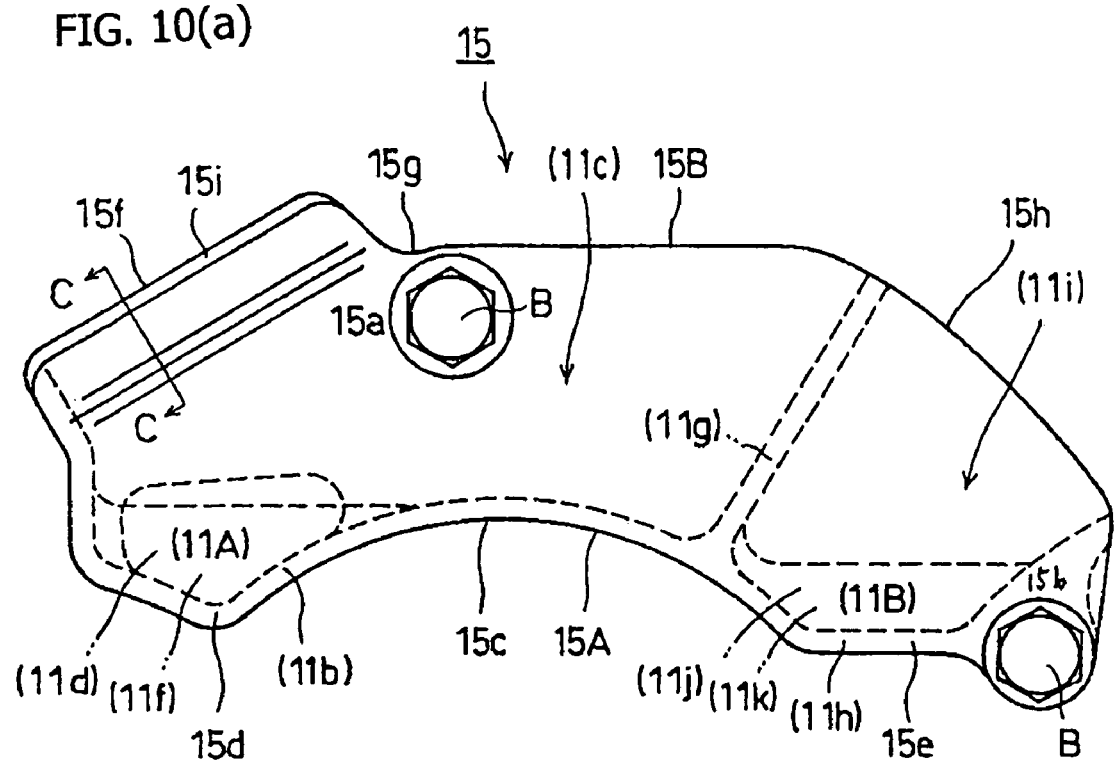
FIG. 10A is a side view of the oil guide plate of the present invention, showing the rearward tilt of the rear portion of the upper peripheral edge, and showing the relationship of the recovered oil receiver and the injected oil receiver with respect to the oil guide plate.
Figure 10B:
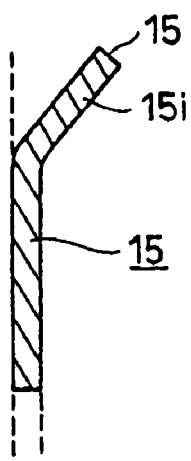
FIG. 10B is a cross-sectional view of the bent upper edge part of the upper peripheral edge of the oil guide plate taken along C—C line in FIG. 10A.

As shown in FIGS. 10A and 10B, the oil guide plate 15 is a plate-like member formed of a relatively thin steel plate or the like. As described above, the plate 15 abuts the side 11a of the right half case 11 and is fixed thereto in such a way that the lower parts 11d and 11j of the respective divided spaces 11c and 11i are covered with the plate 15. The lower parts 11d and 11j are partitioned by the ribs 11b, 11g and 11h (see also FIGS. 3 and 5 and the like).

The oil guide plate 15 is attached to the side 11a of the right half case 11 at two points by fasteners, such as bolts B. A first attachment point is located at an upper position 15a of the plate 15, which corresponds to the position above the main shaft 2 and is slightly toward the rear side of the plate 15 when the plate 15 is in the contact state. A second attachment point is located at a position 15b of the plate 15, which is lower and adjacent to the forefront of the plate and is also in the vicinity of the oil receiver 11B for the injected oil (see also FIG. 6).

The oil guide plate 15 covers the lower parts 11d and 11j of the respective divided spaces 11c and 11i which are partitioned by the ribs 11b, 11g and 11h on the right half case of the crankcase 10. Accordingly, when the oil guide plate 15 is viewed from the side, the outer peripheral shape thereof has a structure in which its lower peripheral edge 15A is aligned with the ribs 11b and 11h substantially forming the lower parts 11d and 11j of the divided spaces 11c and 11i. The outer peripheral shape of the oil guide plate 15 is also configured to include a center part 15c in the lower side thereof, which extends in the form of a substantially concave arc, and also includes end parts 15d and 15e. The end parts 15d and 15e of the plate 15 further extend downward in the front-back-directions of a vehicle. Here, the center part 15c is sandwiched by the end parts 15d and 15e.

Moreover, an upper peripheral edge 15B of the plate 15 is configured to include a linear part 15f, located nearest the rear side of the vehicle and obliquely descending in the rear direction. The upper peripheral edge 15B also includes a linear part 15g connected to the linear part 15f and extending horizontally in the front-back-direction of the vehicle A. Furthermore, a curved part 15h of the upper peripheral edge is provided nearest the front side of a vehicle and extends in the form of a segment of a circle. The curved part 15h is connected to the linear part 15g. Accordingly, on the whole, the plate 15 has a peripheral shape that is similar to a sector when the plate 15 is viewed from the side. The linear part 15f of the upper peripheral edge 15B of the plate 15, which is nearest the rear side of a vehicle and is obliquely descending in the rear direction, includes a bent-upper edge part 15i in which the upper edge thereof is bent in the direction away from the crankcase 10 (see also FIG. 10B).

When the oil guide plate 15 is installed on the side 11a of the right half case 11, the divided spaces 11c and 11i are covered. In addition, the lower spaces 11f and 11k of the respective divided spaces 11c and 11i correspond to the above-described two oil receivers 11A and 11B. Here, the lower spaces 11f and 11k are covered with the end parts 15d and 15e, which further extend downward, and in which the center part 15c having a concave arc is interposed therebetween.

In other words, the lower space 11f of the divided space 11c is considered to be the recovered oil receiver 11A, and the lower space 11f is covered with the part 15d of the oil guide plate 15. The part 15d is located in the rear side and further extends downward when viewed from the front-back-direction of the vehicle A. Moreover, the lower space 11k of the divided space 11i is formed as the oil receiver 11B for the injected oil, and the lower space 11i is covered with the part 15e of the oil guide plate 15. The part 15e is located in the front side and further extends downward.

The bent upper edge part 15i of the upper peripheral edge 15B of the oil guide plate 15 is positioned above the recovered oil receiver 11A. The bent upper edge part 15i easily guides the oil flowing from the oil capturing concave groove 13d of the roof plate 14 to the recovered oil receiver 11A. This is achieved because the bent upper edge part 15i has a bent structure bending in the direction away from the crankcase 10 and a linear structure 15f obliquely descending in the rear direction of the bent upper edge part 15i. With this configuration, the scooped oil is effectively guided to the recovered oil receiver 11A.

In addition, the curved part 15h of the oil guide plate 15, which faces to the front side of the vehicle A and extends downward in the form of a segment of a circle, is positioned just above the oil receiver 11B for the injected oil.

The recovered oil receiver 11A communicates with the oil path 11C. The oil path 11C extends in the direction orthogonal to the front-back-direction of the vehicle A, and extends across in the right half case 11 of the crankcase 10. Specifically, as shown in the diagrams of FIGS. 5 and 6, the recovered oil receiver 11A communicates with the oil path 11C which allows the recovered oil to flow therein and extends in such a manner that it crosses in the half case 11 just above the gear engagement part G1 of the shifting gears on the main shaft 2 and countershaft 3 of the transmission system G. The oil path 11C maintains a parallel relation with both the shafts 2 and 3. Moreover, an oil path 10D2, serving to circulate and supply the injected oil, also communicates with this recovered oil receiver 11A, which will be described later.

The recovery oil path 11C, which crosses in the right half case 11, communicates with and connects to the oil path 12C, similarly extending and crossing in the left half case 12 of the crankcase 10. The oil paths 11C and 12C communicate with, and are connected to, each other to substantially form single-piece structure referred to as recovery oil path 10C. As a result, the recovery oil path 10C extending across the crankcase 10 has the following structure: that is, the recovery oil path 10C extends above the gear engagement part G1 and has a sufficient length to overlie the entire length of the gear engagement part G1 of the shifting gears on the main shaft 2 and countershaft 3 of the transmission system G. In this way, the recovery oil path 10C is formed which crosses the crankcase 10 including the right and left divided half cases 11 and 12.

As described above, the recovery oil path 10C, crossing in the crankcase 10, passes above the gear engagement part G1 of the transmission system G. In the recovery oil path 10C, an oil dropping mechanism is formed for dropping and supplying the recovered oil running through the oil path to the gear engagement part G1. In this embodiment, there are formed dropping holes 10C1 through which oil is dropped (see FIGS. 3 and 5). The dropping hole 10C1 has a predetermined diameter, and the plurality of dropping holes 10C1 are appropriately formed and opened along the path 10C at a predetermined intervals in the front-back-direction. However, the size, shape, and number of the dropping holes 10C1, and furthermore the intervals between the dropping holes 10C1, are set as appropriate.

Moreover, as can be seen from the diagram of FIG. 5, the injected oil receiver 11B communicates with an oil path 11D through which the injected oil flows, and similar to the recovered oil receiver 11A. The oil path 11D extends in the direction orthogonal to the front-back-direction of the vehicle A, across the right half case 11 of the crankcase 10. As described above, and as apparent from FIG. 6 and the like, the injected oil receiver 11B is located at a position that is slightly lower than the recovered oil receiver 11A. Accordingly, the injected oil path 11D is also located at a position that is slightly lower than the recovered oil path 11C. Although not shown in FIG. 5, the oil receiver 11B communicates with the oil inlet 11m (see FIG. 9) through which oil is injected as described above.

The oil path 11D extends across the divided right half case 11 to communicate with and connect to an oil path 12D which likewise extends and crosses in the left half case 12 of the crankcase 10. This results one injected oil path 10D in which the paths 11D and 12D communicate with, and connected to, each other to substantially form single-piece structure. The injected oil path 10D extends across the crankcase 10 including the right and left divided half cases 11 and 12. A part of the injected oil flowing through the injected oil path 10D is supplied to the main shaft 2 via a path. A part of the path is not illustrated here. The remaining oil in the injected oil path 10D is circulated and supplied to the recovered oil receiver 11A via a connection path 12D1 and a second injected oil path 12D2, which are described later.

As can be seen from the above statements, the recovered recovery oil path 10C and the injected oil path 10D cross in the crankcase 10 consisting of the right and left divided half cases 11 and 12. That is, the recovered recovery oil path 10C and the injected oil path 10D are in parallel with each other and extend across the crankcase 10 while maintaining a predetermined interval therebetween.

As shown in FIG. 5, an oil path 10D2 is formed in the crankcase 10. The oil path 10D2 is different from the recovered recovery oil path 10C and the injected oil path 10D. One end of the oil path 10D2 communicates with the connection path 12D1, which is formed inside the left side wall of the left half case 12 shown in the drawing, and which is connected to the above-described injected oil path 10D in the crankcase 10. The other end of the oil path 10D2 communicates with the recovered oil receiver 11A of the right half case 11. The oil which has been injected into the injected oil receiver 11B via this oil path 10D2 is circulated and supplied to the recovered oil receiver 11A. This oil path forms the second oil path 10D2.

An overflow hole X for ejecting excess oil is provided to the side of the right half case 11, at a location corresponding to a slightly lower part of the gear engagement part G1 in the transmission system G of the main shaft 2 and countershaft 3. More specifically, the overflow hole X is positioned corresponding to a slightly lower part of the gear engagement part G1 that is located substantially beneath the recovered oil receiver 11A when the half case 11 is viewed from the side. In this embodiment, the overflow hole X is only provided in the right half case 11 shown in FIGS. 6 to 8. However, a similar overflow hole can also be provided in the left half case 12.

Brief descriptions will now be provided to explain the recovery of the oil which has been scooped up by the clutch 2b, and to explain the effect of lubrication using this oil, with reference to FIGS. 3–5.

It is to be noted that the rotary member, the oil path, the oil guide plate and the roof plate, which are described in the claims, are equivalent to the clutch 2b, the oil path 11C, the oil guide plate 15 and the roof plate 14, respectively.

The oil, which has been scooped up via the rotation R of the clutch 2b attached to the main shaft 2, is captured by the roof plate 14 of the case cover 13. That is, the oil is captured by the concave groove 13d formed on the predetermined upper portion of the cylindrical inner surface 13c of the case cover 13. The scooped oil flows in such a way that it obliquely crosses the cylindrical inner surface 13c along the concave groove 13d.

The captured oil that flows along the concave groove 13d is effectively guided by the structure of the groove 13e, which extends in a smooth curve and in which its bottom 13h gradually deepens with distance from outside the clutch cover 13, and toward the crankcase 10 side. The oil is then allowed to flow toward a crankcase 10 side open-end of the concave groove 13d, which is formed at an upper portion of the oil guide plate 15.

The oil which has reached the crankcase 10 side-open-end of the concave groove 13d is guided by the bent part of the bent upper edge part 15i. The bent upper edge part 15i bends in the direction away from the crankcase 10 located behind (left) the oil guide plate 15. The oil then flows along a plane 15f inclined downward to the rear side of the bent upper edge part 15i, and then is guided to the recovered oil receiver 11A at the side 11a of the right half case 11.

The recovered oil, which has been guided to the recovered oil receiver 11A, flows along the recovered oil path 11C of the right half case 11, and flows toward the recovered oil path 12C of the left half case 12. In this flowing process, the oil drops by gravity from the plurality of oil dropping holes 10C1 formed in the recovered oil paths 11C and 12C, down to the gear engagement part G1 of the main shaft 2 and countershaft 3 of the transmission system G located below the paths 11C and 12C. In this manner, the lubrication of the gear engagement part G1 is achieved.

Furthermore, this embodiment adopts a configuration that allows the recovered oil to flow via the plurality of oil dropping holes 10C1. However, a configuration may be adopted in which such dropping holes are not provided in the recovered oil paths 11C and 12C, and in which the oil overflowed in the recovered oil paths 11C and 12C emerges from their edges.

Meanwhile, the oil which has been injected from the oil inlet 11m (see FIG. 9) floods into the injected oil receiver 11B and flows from the injected oil receiver 11B along the injected oil path 11D of the right-side half case 11. The injected oil then flows through the injected oil path 12D of the left half case 12, and crosses crankcase 10 consisting of the right and left divided half cases 11 and 12. A portion of this oil is then supplied to the main shaft 2 from an opening 12E (see FIG. 2) via an unillustrated path communicating with the injected oil path 12D.

The remaining portion of the injected oil flows from the injected oil path 12D into the connection path 12D1 which is located inside the left side wall of the left half case 12 shown in FIG. 5. However, since the injected oil receiver 11B and injected oil paths 11D and 12D are located at positions that are slightly lower than the recovered oil receiver 11A and the recovered oil paths 11C and 11D, only the injected oil in which the liquid level is in excess of certain limits is allowed to flow into the connection path 12D1.

The oil flowing within the connection path 12D1 makes a turn after passing through the connection path 12D1. This oil then flows through the second injected oil path 10D2 crossing the crankcase 10, is circulated and supplied to the recovered oil receiver 11A of the right half case 11. In the recovered oil receiver 11A, the overflow oil meets the aforementioned recovered oil and follows the above-described path of the recovered oil, and is supplied to the gear engagement part G1 of the transmission system G for the aforementioned lubrication.

In the embodiment of the present invention, the concave groove 13d of the roof plate 14 crosses in an oblique direction while facing the outer circumference 2b1 of the clutch 2b. The concave groove 13d is aligned with the rotation direction of the clutch 2b, and has a structure that deepens gradually from outside to inside with a gentle slope. Accordingly, it is possible to effectively capture the oil which has been scooped up via the rotation of the clutch 2b, and to facilitate the smooth guidance of the captured oil to the recovered oil receiver 11A.

The oil guide plate 15 includes the bent upper edge part 15i which is angled toward to the lower adjacent part of the concave groove 13d of the roof plate 14 in the oblique and backward direction and which is bent in the direction away from the crankcase 10 side. Accordingly, the flowing oil which has been guided by the concave groove 13d of the roof plate 14 is further smoothly guided by the bent upper edge part 15i and runs downward along the bent upper edge part 15i. In this way, this oil is effectively guided to the recovered oil receiver 11A.

The recovered oil receiver 11A communicates with the recovered recovery oil path 10C which extends across the crankcase 10. The plurality of oil dropping holes 10C1 are formed and opened within the path 10C. Oil drops from these holes by gravity and thereby the gear engagement part G1 is lubricated. Accordingly, simple and reliable lubrication of the gear engagement part G1 can be achieved without any extra cost.

The oil in the injected oil path 10D is guided to the recovered oil receiver 11A via the connection path 12D1 and the second injected oil path 10D2. Accordingly, an oil shortage in the recovered recovery oil path 10C is resolved, leading to effective and reliable lubrication of the gear engagement part G1.

In the embodiment of the present invention, the engine having the lubrication structure of the present invention is considered to be an engine for motorcycles. However, the engine having this lubrication structure is not limited to an engine for motorcycles, and accordingly can be used in other similar vehicles.

While a working example of the present invention has been described above, the present invention is not limited to the working example described above, but various design alterations may be carried out without departing from the present invention as set forth in the claims.

What is claimed is:

1. An engine, comprising:
   a crankcase having an oil pan disposed at a lower portion thereof;
   a crankshaft which is rotatably supported in the crankcase;
   a rotary member for scooping oil from the oil pan, the rotary member attached to the crankshaft for concurrent rotation therewith; and
   an oil distribution system, comprising:
   an oil receiver for receiving oil which has been scooped up by the rotary member;
   an oil path formed inside of said engine for circulating lubricating oil from the oil receiver to other parts of the crankcase; and
   an oil guide plate operatively attached to the crankcase for guiding oil, which has been scooped up by the rotary member, to the oil receiver;
   wherein the oil receiver is formed on a side of the crankcase.

2. The engine according to claim 1, wherein:
   the oil guide plate abuts the oil receiver and guides the scooped oil to the oil receiver, and
   the oil receiver is positioned above a gear engagement part of a transmission system.

3. The engine according to claim 1, wherein the oil guide plate has a bent upper edge part at its upper portion for guiding the scooped oil to the oil receiver, the bent upper edge part being angled, and the upper edge thereof bent in a direction away from the oil receiver.

4. The engine according to claim 1, further comprising a roof plate which overlies the oil guide plate when viewed from the side of the engine, and the roof plate comprises a structure for capturing oil which has been scooped up by the rotary member, and guiding the captured oil to the oil receiver.

5. The engine according to claim 4, wherein the roof plate is inclined such that oil is guided to the oil receiver by moving on the surface thereof.

6. The engine according to claim 4, wherein the roof plate has an elongate, curved, concave groove formed in an interior surface thereof.

7. The engine according to claim 6, wherein the groove is provided with a depth which decreases with distance from the oil guide plate.

8. The engine according to claim 1, wherein the oil receiver communicates with the interior of the crankcase via an opening formed in a side wall of the crankcase,
   wherein the oil guide plate has a shaped peripheral edge, and
   wherein the oil guide plate is fixed to the side wall of the crankcase to partially cover said opening in the side wall of the crank case.

9. The engine according to claim 8, wherein an upper peripheral edge of the oil guide plate is provided with a bent portion, the bent portion being spaced apart from the side wall of the crank case.

10. The engine according to claim 1, wherein an upper peripheral edge of the oil guide plate is provided with an angled portion, the angled portion positioned adjacent a side edge of the oil guide plate, the angled portion angled so as to slope downwardly from the upper peripheral edge toward the side edge of the oil guide plate.

11. An engine comprising:
a crankcase having an oil pan at a lower portion thereof;
a crankshaft which is rotatably supported in the crankcase;
a rotary member attached to the crankshaft for concurrent rotation therewith, and for scooping up oil from the oil pan at the lower portion of the crankcase, wherein said rotary member comprises a clutch; and
an engine lubricating structure, comprising:
an oil receiver for receiving oil which has been scooped up by the rotary member, the oil receiver communicating with the interior of the crankcase via an opening formed in a side wall of the crankcase;
an oil guide plate attached to the side wall of the crankcase for guiding oil, which has been scooped up by the rotary member, to the oil receiver, wherein the oil guide plate is fixed to the side wall of the crankcase so as to partially cover said opening in the side wall of the crank case; and
an oil path formed in said crankcase for circulating lubricating oil from the oil receiver to selected parts of the crankcase.

12. The engine according to claim 11, wherein
the oil guide plate abuts the oil receiver and guides the scooped oil to the oil receiver, and
the oil receiver is positioned above a gear engagement part of a transmission system.

13. The engine according to claim 11, wherein
wherein the oil guide plate has at its upper portion a bent upper edge part for guiding the scooped oil to the oil receiver, the bent upper edge part being angled, and the upper edge thereof bent in a direction away from the oil receiver.

14. The engine according to claim 11, wherein
a roof plate overlies the oil guide plate when viewed from the side of the engine, and the roof plate comprises a structure for capturing oil which has been scooped up by the rotary member, and guiding the captured oil to the oil receiver.

15. The engine according to claim 14, wherein the roof plate is inclined such that oil is guided to the oil receiver by moving on the surface thereof.

16. The engine according to claim 14, wherein the roof plate has an elongate, curved, concave groove formed therein.

17. The engine according to claim 16, wherein the groove is provided with a depth which decreases with distance from the oil guide plate.

18. The engine according to claim 11, wherein an upper peripheral edge of the oil guide plate is provided with an angled portion, the angled portion positioned adjacent a side edge of the oil guide plate, the angled portion angled so as to slope downwardly from the upper peripheral edge toward the side edge of the oil guide plate.

19. A method of circulating lubricating oil within an engine, said method comprising the steps of:
a) accumulating oil in an oil pan disposed at a lower portion of a crankcase of said engine;
b) scooping oil from the oil pan using a rotary member attached to a crankshaft rotatably mounted in said crankcase;
c) guiding oil, which has been scooped up by the rotary member, across an oil guide plate and to an oil receiver formed on a side of the crankcase; and
d) circulating lubricating oil from the oil receiver along an oil path formed inside of said engine to other parts of the crankcase.

20. The method of claim 19, wherein the rotary member comprises a clutch.

* * * * *